(12) United States Patent
Bogden et al.

(10) Patent No.: US 6,196,797 B1
(45) Date of Patent: Mar. 6, 2001

(54) ELECTRONIC SELF-POWERED PROPELLER GOVERNOR

(75) Inventors: John M. Bogden, Troy; John A. Davila, Vandalia, both of OH (US)

(73) Assignee: Cessna Aircraft Company, Wichita, KS (US)

(*) Notice: Subject to any disclaimer, the term of this patent is extended or adjusted under 35 U.S.C. 154(b) by 0 days.

(21) Appl. No.: 09/378,952

(22) Filed: Aug. 23, 1999

(51) Int. Cl.$^7$ .................................................. B63H 3/06
(52) U.S. Cl. ................................ 416/35; 416/49; 416/3; 416/157 R
(58) Field of Search ........................ 416/35, 44, 47, 416/48, 49, 157 R, 151, 155, 156, 158, 3

(56) References Cited

U.S. PATENT DOCUMENTS

| | | | |
|---|---|---|---|
| 2,491,172 | * 12/1949 | Forsyth | 416/32 |
| 3,575,529 | * 4/1971 | Bierman | 416/27 |
| 3,589,830 | * 6/1971 | Mogren et al. | 416/1 |
| 3,589,832 | * 6/1971 | Harris et al. | 416/34 |
| 3,751,993 | * 8/1973 | Davis | 73/514.39 |
| 3,831,615 | * 8/1974 | Hartzell | 137/53 |
| 4,556,366 | * 12/1985 | Sargisson et al. | 416/155 |
| 4,842,484 | * 6/1989 | Johnson | 416/127 |
| 5,415,523 | * 5/1995 | Muller | 416/35 |

* cited by examiner

Primary Examiner—Edward K. Look
Assistant Examiner—Liam McDowell
(74) Attorney, Agent, or Firm—Edward L. Brown, Jr.

(57) ABSTRACT

An electronic self-powered propeller governor driven off the aircraft engine includes a drive shaft which drives a hydraulic pump to produce pressurized oil to move a hydraulically controlled piston connected to the propeller blade for changing the blade pitch. A hydraulic control valve which controls the position of the piston includes a spool which is positioned within the drive shaft and supplies pressure to the piston for changing the pitch of the propeller blade. The drive shaft also drives an AC generator producing an electrical RPM signal which is supplied to a linear control circuit. A manually operated RPM control produces an electrical signal supplied to said linear control circuit which is compared with the RPM signal produced by the generator and in turn the linear control circuit signals an actuator. Also contained within the governor is a linear variable force electrical actuator which is connected to the control valve spool acting against a spring which positions the control valve spool to reposition the propeller blade and change the RPM to conform with the signal produced by the manual RPM control.

7 Claims, 1 Drawing Sheet

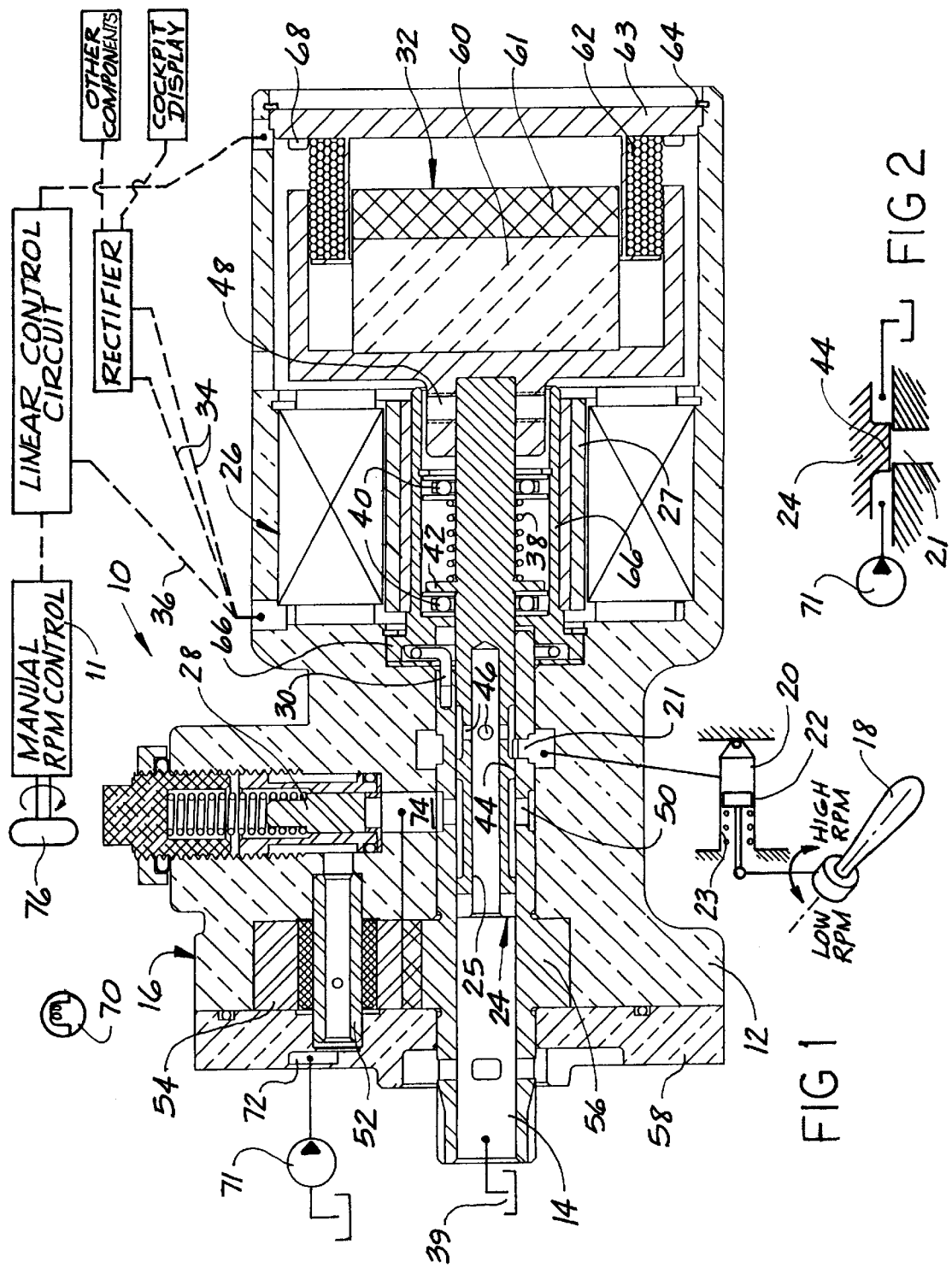

ELECTRONIC SELF-POWERED PROPELLER GOVERNOR

BACKGROUND OF THE INVENTION

The present invention relates to a governor for aircraft propellers and more specifically to electronically controlled governors which provide their own power.

Governors for variable pitch propellers are well known and usually comprise a device mounted on and driven by the engine which senses and controls propeller (RPM) by hydraulically adjusting the pitch of the propeller. A common type of governor employs a hydraulic 3-position spool valve with a flyweight type actuator connected thereto to shift the valve spool in one direction or the other as the centrifugal force of the rotating flyweights increase or decrease spring force acting on the valve member which opposes the force of the flyweights. As the propeller begins to over speed, the increasing centrifugal force on the flyweights overcomes the speeder spring and shifts the valve spool so as to allow oil to flow to a hydraulic cylinder in the propeller hub which increases the pitch of the propeller blades thus increasing torque of the propeller causing the propeller speed to slow down to maintain the original RPM setting of the governor. Mechanical governors of this type for controlling variable pitch propellers have been available on airplanes for the better part of this century. They are typically used in a constant speed propeller governing system wherein the load on the engine varies and the propeller blade must change its pitch so as to maintain a constant RPM. Propeller governors have previously been electrically actuated, as taught in U.S. Pat. Nos. 3,831,615 and 3,751,993. However, both of these patents sense speed mechanically while the present invention senses speed electrically with the use of a small generator.

The general concept of a prime mover for a vehicle driving a generator goes back to the early automotive days. Locating the generator on a rotating propeller hub to provide electrical energy for changing pitch of the blades is taught in U.S. Pat. No. 4,556,366 and U.S. Pat. No. 2,491,172. These two patents also teach using the produced electrical energy for other functions.

SUMMARY OF THE PRESENT INVENTION

The propeller governor of the present invention is similar to prior propeller governors in that it changes pitch of the blades hydraulically through a single acting cylinder located in the propeller hub having actuating links connecting the cylinder piston to the blade shank of each blade for altering the blade pitch. The governor which is engine driven also includes a hydraulic pump for producing pressurized oil for actuating the hydraulic cylinder in the propeller. Also the governor includes a hydraulic 3-position spool control valve for dispensing oil pressure acting on the piston to either increase pitch, hold pitch or reduce pitch. The directional control valve spool is positioned by a linear actuator which provides a variable force acting against a spring to maintain the propeller blade pitch to conform with an electrical signal produced by an electronic vernier RPM control. This vernier is manually set or changed by the pilot. The linear variable actuator, also referred to as a voice coil, provides a variable force depending upon the current flow in the coil of the actuator which is supplied by a linear control circuit.

Also built into the governor is an alternating current three-phase power generator having a rotor driven by the same drive shaft which drives the governor. One or more phases of the generator provides an electrical signal to the linear control circuit for the actual RPM of the governor while all three phases from the generator provide electrical power to run the linear control circuit and also provide a backup electrical supply for emergency situations when there is failure of the aircraft primary electrical power. The pilot-operated electronic vernier RPM control actuates a potentiometer which signals the linear control circuit to change the engine RPM. This electrical signal from the vernier control is compared in the linear control circuit with the RPM signal produced by the generator, and if they are different, the linear control circuit signals the voice coil to reposition the control valve spool until the signals from the manual control and the generator are identical. The three-phase AC generator has multiple functions including frequency signals which indicate the actual RPM of the engine as well as AC electrical power converted to DC for driving the linear control circuit as well as other components in the aircraft such as radios, gyros and other navigational instruments. The governor of the present invention also has application not only in constant speed propellers but also in systems which provide full-feathering, reversing and beta control. Depending upon the application, the pressurized oil can function to either increase or decrease pitch.

It is therefore the principal object of the present invention to provide a propeller governor which replaces the flyweight assembly of a mechanical governor with a generator that will produce the power for the pitch control system as well as producing a propeller RPM signal.

Another object of the present invention is to provide an electric propeller governor which also produces back up power in emergency situations.

A further object of the present invention is an electric propeller governor which includes a default mode wherein the propeller blades are forced to a minimum pitch position.

BRIEF DESCRIPTION OF THE DRAWINGS

FIG. 1 is a vertical section through the center of the governor with the various input and output controls illustrated symbolically;

FIG. 2 is a partial section to an enlarged scale of the control valve spool land in a holding position.

DESCRIPTION OF THE PREFERRED EMBODIMENT

Referring to FIG. 1, the governor of the present invention is generally described by reference numeral 10. The governor comprises a body 12 which rotatably supports a driveshaft 14, driven off the aircraft engine which is not shown. On the left end of the governor body 12 is a pump cover plate 58 which encloses a gear pump 16, including idler gear 54 and drive gear 56 which is formed integral with driveshaft 14. Gear pump 16 is supplied with inlet oil from the engine pump 71 through cavity 72 in the pump cover plate 58. Pump 16 discharges pressurized oil into cavity 74 which flows through ports 50 in rotating driveshaft 14 so as to pressurize the left side of the valve spool land 44, as best seen in FIG. 2. Unused pressure from pump 16 is released across pressure relief valve 28 through idler gear stud 52 which in turn is connected to the intake side of gear pump 16.

Positioned inside driveshaft 14 is a spool 24 of the control valve which changes the pitch of propeller blade 18 through the action of single acting hydraulic cylinder 20. Spool 24 is connected to actuator 32 through pin 48 located at the right end of valve spool 24.

Actuator 32 is a linear variable force actuator, also referred to as a voice coil, which can exert a variable force on spool 24 acting against compression spring 38. Actuator 32 is powered by a coil 62 which surrounds a magnet 60 and poll piece 61. The full stroke of actuator 32 is approximately 0.25 inches where upon it contacts stop 68. Actuator 32 is removably held in place by a back plate 63 and a snap ring 64.

Located in the center of governor body 12 is an AC power generator 26 having a rotor made up of magnet 27 and spring can 66. Spring can 66 is driven by driveshaft 14 through a torsion spring 30 so as to diminish vibrational damage to the generator rotor. Generator 26 is a three-phase AC generator including 1,440 electrical degrees for each mechanical revolution. One of the generator leads 36 provides an actual propeller RPM pulse signal to the linear control circuit, symbolically shown in the drawing, while all three phases 36 and 34 provide power for the pitch control system as well as additional backup power for flight instruments or other power requirements.

The vernier RPM control 11, located in the cockpit, is basically a potentiometer. The voltage from the potentiometer will be converted to a frequency and compared with the actual RPM frequency signal generated by the generator. If the RPM signal from the generator is greater than the pilot's set RPM signal, the actuator 32 is commanded to move in one direction a distance proportional to the time difference between the two arriving signals and at a rate proportional to the rate of RPM error (PID controller). If the RPM signal from the generator is less than the pilot's set RPM signal, the actuator 32 is commanded to move in the opposite direction. A switch mounted in the linear control circuit will flip control to pressure to increase pitch and pressure to decrease pitch applications.

The variable force produced by actuator 32 urges spool 24 to the right, as seen in FIG. 1, acting against compression spring 38 through flange 42. The generator spring can 66 rotates with drive shaft 14.

Control valve spool 24 either opens control cylinder 20 to pressure which lowers RPM or to drain which increases RPM as in constant speed applications. In the decrease RPM condition, valve land 44 shifts to the right, from the FIG. 2 position, opening pump pressure from port 50 to flow into cylinder 20 via port 21. For higher RPM, spool land 44, shifts to the left, as seen in FIG. 1, opening port 21 to drain via ports 46 in valve spool 24 through center bore 25 which connects to drain 39. Cylinder 20 is open to drain and the natural centrifugal twisting moment and the spring force on the rotating propeller blades cause piston 22 to retract and force the unpressurized oil to drain 39. This natural centrifugal twisting moment on the blades is symbolically illustrated by a compression spring 23.

When the actual RPM signal and the manually set signal are the same, spool land 44 will be in its FIG. 2 position blocking flow both in and out of cylinder 20. Valve spool land 44 overlaps port 21 approximately 0.001 inches. Various metering modifications can be made to land 44, which are well known in the hydraulic art to improve the valve's performance.

Operation

In a constant speed propeller governing system, the pilot will set the desired RPM by manually turning or pushing knob 76 on vernier control 11 located in the cockpit. Knob 76 will vary a potentiometer, which will send a change in voltage to the linear control circuit. That voltage signal will be converted to a frequency and compared with the actual RPM signal produced by generator 26. If the RPM signal from the generator is greater than the pilot's RPM signal, the actuator 32 is commanded to move in one direction at a distance proportional to the time difference between the arriving signals and at a rate proportional to the rate of RPM error (PID controller). If the RPM signal from the generator 26 is less than the pilot's set RPM signal, the actuator 32 is commanded to move in the opposite direction. If the RPM signals are the same, the actuator 32 will shift the spool land 44 to it; FIG. 2 position and hold the pitch in its position.

The linear control circuit will monitor itself using a current monitor. A short circuit, an open circuit or an over temperature will cause the system to shut down and move blades 18 to a minimum pitch high RPM position as in constant speed applications. Color lamp 70 in the cockpit will illuminate one color if the pilot initiates the default mode or another color if the system shuts down itself.

While the present invention has been described with respect to specific preferred embodiments, numerous modifications will suggest themselves to those of ordinary skill in the art and accordingly the scope of the present invention is to be measured only by that of the appended claims:

What is claimed is:

1. An electronic self powered propeller governor for controlling propeller blades driven off an aircraft engine comprising:
   a drive shaft driven by the aircraft engine;
   a hydraulic pump driven by said drive shaft;
   a hydraulically controlled piston connected to the propeller blades for changing the blade pitch;
   a hydraulic control valve which controls the position of said piston with pressure supplied to the valve by said hydraulic pump;
   an AC generator having a rotor driven by said drive shaft producing an electrical RPM signal;
   a linear control circuit supplied by said electrical RPM signal from said generator;
   a manually operated RPM control means which produces an electrical signal supplied to said linear control circuit which is compared with the RPM signal produced by generator, and in turn the linear control circuit signals an actuator;
   a linear variable force electrical actuator connected to said control valve acting against a spring force which positions the control valve to reposition the propeller blade and change the RPM to conform with the signal produced by the manual RPM control.

2. An electronic self-powered propeller governor as set forth in claim 1 wherein the AC generator is at least two phase.

3. An electronic self-powered propeller governor as set forth in claim 1 wherein the hydraulic control valve includes a valve spool positioned concentrically within the drive shaft.

4. An electronic self-powered propeller governor as set forth in claim 1 wherein the hydraulic control valve includes a valve spool positioned concentrically within the drive shaft and extending concentrically through said AC generator.

5. An electronic self-powered propeller governor as set forth in claim 1 wherein the hydraulic control valve includes a valve spool positioned concentrically within the drive shaft and the drive shaft is concentrically connected to the rotor of the AC generator through a torsion spring.

6. An electronic self-powered propeller governor as set forth in claim 1 wherein the AC generator is at least two phase and one or more phases provides a frequency signal compared with the signal produced by the manually operated RPM control means and all three phases provide an alternate power source for the aircraft.

7. An electronic self powered propeller governor for controlling propeller blades driven off an aircraft engine comprising:

a drive shaft driven by the aircraft engine;

a hydraulic pump driven by said drive shaft;

a hydraulically controlled piston connected to the propeller blades for changing the blade pitch;

a hydraulic control valve which controls the position of said piston with pressure supplied to the valve by said hydraulic pump;

an AC generator having at least two phases, the generator including a rotor driven by said drive shaft producing an electrical RPM signal in the first phase and a power source in the second phase;

a linear control circuit means supplied by said electrical RPM signal from the first phase of said generator and powered by the second phase;

a manually operated RPM control means which produces an electrical signal supplied to said linear control circuit means which is compared with the RPM signal produced by generator, and in turn the linear control circuit means signals an actuator;

a linear variable force electrical actuator connected to said control valve acting against a spring force which positions the control valve to reposition the propeller blade and change the RPM to conform with the signal produced by the manual RPM control.

* * * * *